US008925965B2

(12) United States Patent
Pecora

(10) Patent No.: US 8,925,965 B2
(45) Date of Patent: Jan. 6, 2015

(54) UTILITY TRAY

(76) Inventor: Louis G Pecora, Seaford, NY (US)

( * ) Notice: Subject to any disclaimer, the term of this patent is extended or adjusted under 35 U.S.C. 154(b) by 183 days.

(21) Appl. No.: 13/385,920

(22) Filed: Mar. 14, 2012

(65) Prior Publication Data

US 2013/0069354 A1  Mar. 21, 2013

Related U.S. Application Data

(60) Provisional application No. 61/465,391, filed on Mar. 18, 2011.

(51) Int. Cl.
*B62J 7/04* (2006.01)
*B62J 9/02* (2006.01)
*B60R 9/06* (2006.01)

(52) U.S. Cl.
CPC ... *B60R 9/06* (2013.01); *B62J 9/02* (2013.01); *B62J 7/04* (2013.01)
USPC ............................................ 280/769; 224/413

(58) Field of Classification Search
USPC .............. 280/769; 224/413, 423; 296/3, 37.1
See application file for complete search history.

(56) References Cited

U.S. PATENT DOCUMENTS

| | | | | |
|---|---|---|---|---|
| 4,174,796 A * | 11/1979 | Nakamura | .................... | 224/444 |
| 4,247,030 A * | 1/1981 | Amacker | .................... | 224/401 |
| 4,257,544 A * | 3/1981 | Dierkes | .................... | 224/413 |
| 4,266,703 A * | 5/1981 | Litz | .................... | 224/443 |
| 4,311,261 A * | 1/1982 | Anderson et al. | .................... | 224/418 |
| 4,974,765 A * | 12/1990 | Marchetto et al. | .................... | 224/275 |
| 5,102,021 A * | 4/1992 | Perea | .................... | 224/440 |
| 5,341,971 A * | 8/1994 | Newbold et al. | .................... | 224/422 |
| 5,465,882 A * | 11/1995 | Shinohara | .................... | 224/413 |
| 5,531,364 A * | 7/1996 | Buis | .................... | 224/413 |
| 5,931,360 A * | 8/1999 | Reichert | .................... | 224/413 |
| 6,354,476 B1 * | 3/2002 | Alderman | .................... | 224/413 |
| 6,484,914 B1 * | 11/2002 | Willey | .................... | 224/413 |
| 6,729,516 B2 * | 5/2004 | Hanagan | .................... | 224/423 |
| 7,011,240 B2 * | 3/2006 | Kan et al. | .................... | 224/413 |
| 7,036,837 B1 * | 5/2006 | Bauer et al. | .................... | 280/288.4 |
| 7,303,221 B2 * | 12/2007 | Takahashi et al. | .................... | 296/37.1 |
| 7,350,854 B2 * | 4/2008 | Harper | .................... | 296/198 |
| 7,556,114 B2 * | 7/2009 | Hanagan | .................... | 180/219 |
| 7,571,921 B1 * | 8/2009 | Hoeve | .................... | 280/288.4 |
| 7,854,460 B2 * | 12/2010 | Tweet et al. | .................... | 296/65.03 |
| 8,011,542 B2 * | 9/2011 | Gandy et al. | .................... | 224/413 |
| 8,011,543 B2 * | 9/2011 | Premartin et al. | .................... | 224/511 |
| 8,096,582 B2 * | 1/2012 | Longwell et al. | .................... | 280/769 |
| 8,225,972 B2 * | 7/2012 | Butkiewicz et al. | .................... | 224/413 |

(Continued)

*Primary Examiner* — Katy M Ebner

(57) ABSTRACT

This utility tray is rectangular in shape and mounts securely to the rear fender of a motorcross bike. The main frame has tapered side walls with U-shaped cuts to accommodate tools such as Tee Handle Wrenches. A quarter portion of the utility tray has a top tray. The top tray incorporates two large holes to accommodate aerosol cans and two small holes for the front and rear axles. On the back section of the top tray is a tool rail with strategic holes for screwdrivers, bolts and sockets. The bottom of the main frame mounts a trapezoid shaped fender pocket, four non slip standoffs and an auxiliary stabilizer strap. To mount the utility tray, insert the rear fender into the trapezoid fender pocket and apply the strap. This combination gives the utility tray a tremendous amount of stability. While the utility tray is mounted, the seat is able to be removed to access the air filter. The utility tray stores in a vertical position when mounted on a wall bracket. In this position the utility tray will accommodate three aerosol cans.

6 Claims, 9 Drawing Sheets

(56) References Cited

U.S. PATENT DOCUMENTS 8,579,169 B2 * 11/2013 Racz et al. .................. 224/413
2005/0258207 A1 * 11/2005 Sadler ......................... 224/413
2008/0073396 A1 * 3/2008 Chiang et al. ............... 224/413

* cited by examiner

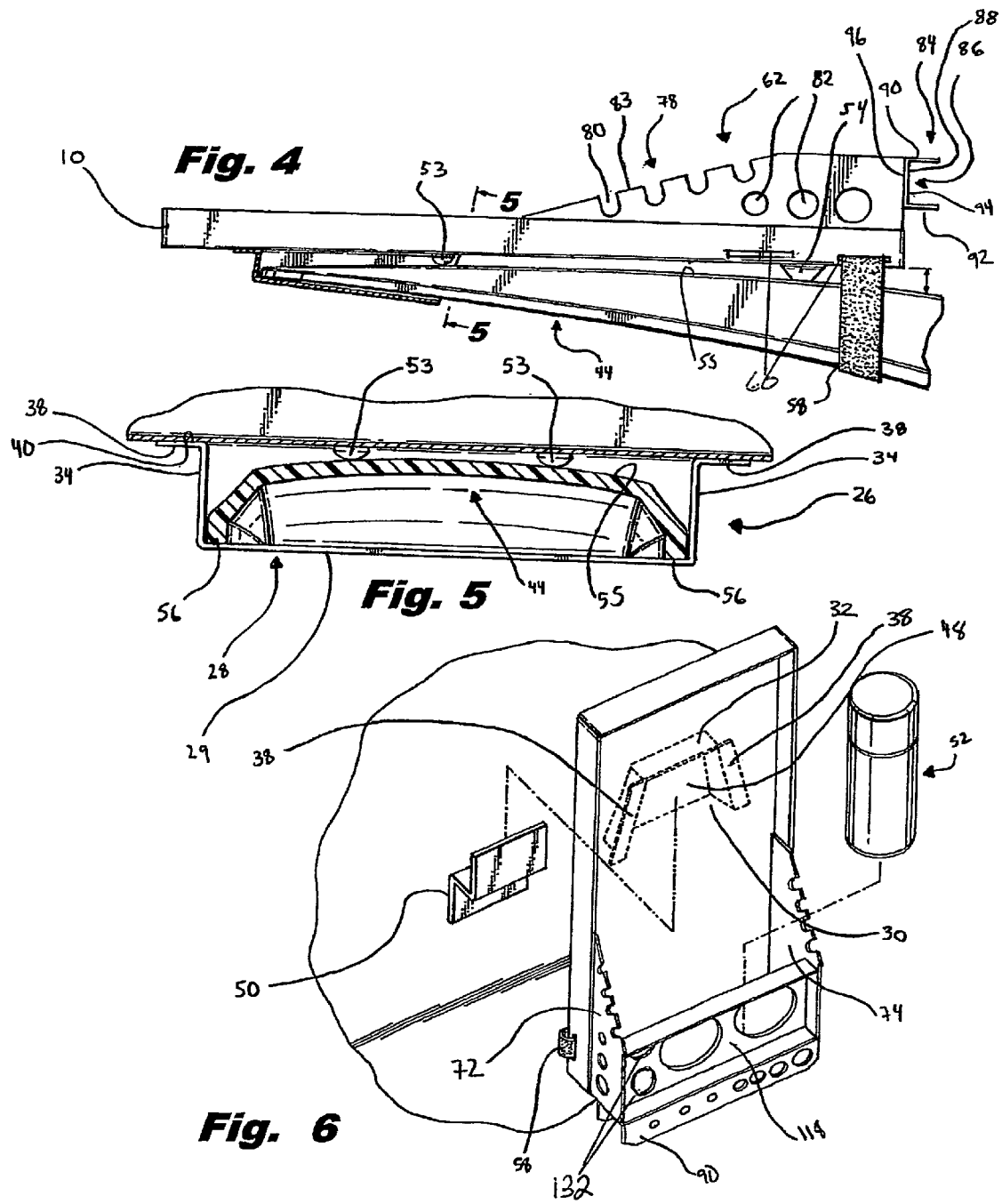

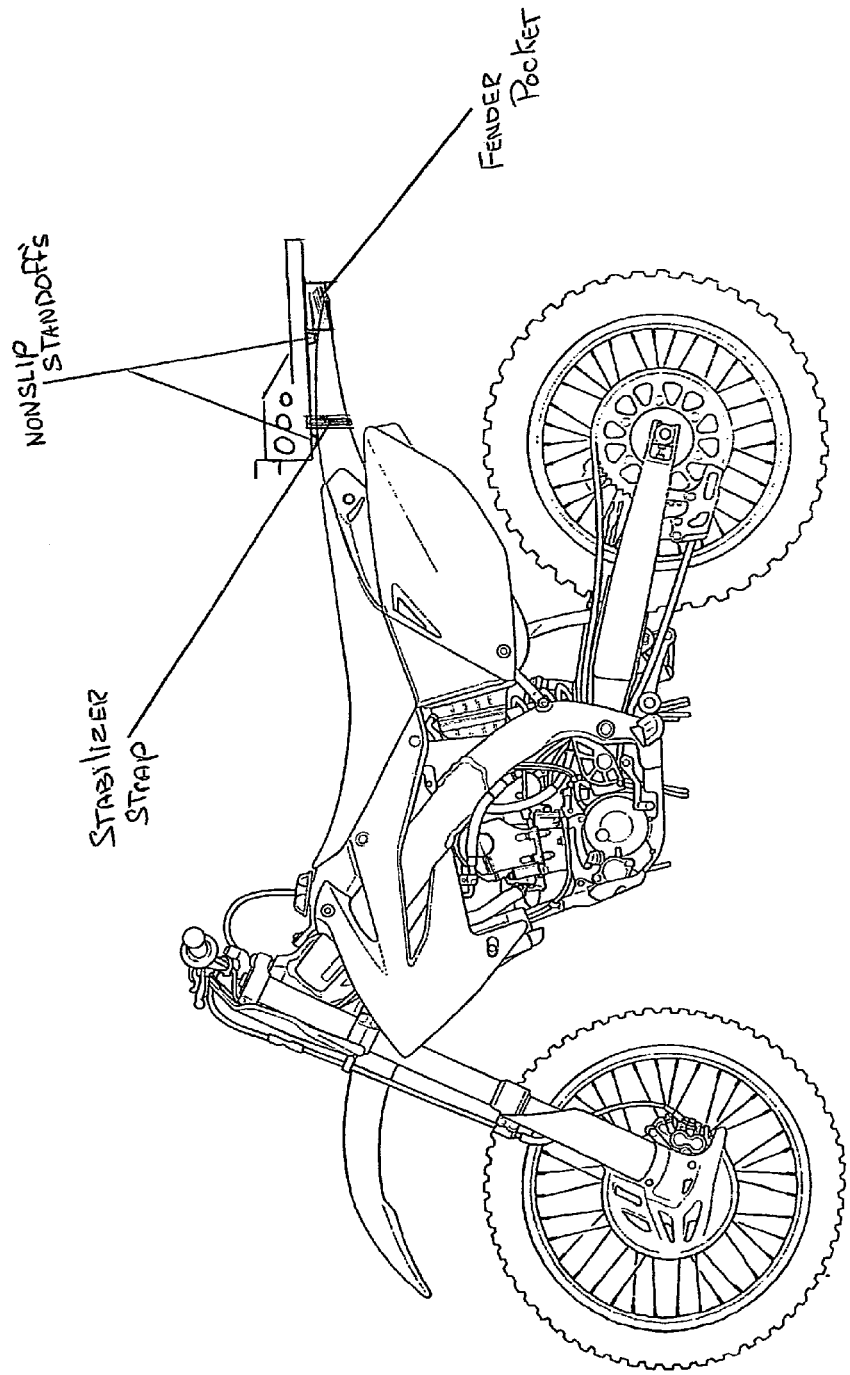

UTILITY TRAY

This application claims priority To Provisional Application File date of Mar. 18, 2011 Ser. No. 61/465391

BACKGROUND OF THE INVENTION

1. Field of the Invention

The present invention relates to utility trays for holding and organizing tools, and more particularly relates to fender mountable utility trays.

2. Description of the Prior Art

Motorcycles and dirt bikes (motorcross or off-road motorcycles) require constant maintenance. In particular, dirt bikes used for recreation and competition in less than desirable areas such as in the woods, deserts and motorcross tracks require constant upkeep. Often, sudden repairs are necessary in areas where a shop or garage is not readily available. As such, many repairs become difficult and complicated due to the presence of dirt and the lack of storage areas to organize parts and tools. Even during simple repairs, such as changing a tire or changing the rear brakes, it is essential that the removed parts are kept clean and dirt-free. It is common for mechanics to store tools and parts on the ground while making repairs, which can further damage the dirt bike. Unless the removed parts are carefully monitored, dirt and debris easily adhere to the components, impacting the operation and maintenance of the dirt bike. Furthermore, storing items on the ground yields the inherent problem of losing tools and parts. Additionally, the constant act of bending down for parts and tools can make repairs uncomfortable and tiring for the mechanic.

All known tool tray and devices for storing tool or parts while working on the motorcycle are extremely unstable and do not mount securely to the bike.

Several types of service trays are currently available that attempt to reconcile some of the problems associated with dirt bike repairs; however, the design of each device also presents new problems. One device, the Moto-Tek® Race-Tray Dirt Motorcycle Service Tray, available at www.moto-tek.com/race-tray.html, provides a single level tray mountable to the fender of a dirt bike. The tray includes storage for tools within the tray and along an outer perimeter thereof. Unfortunately, this creates the problem of tool projecting downwards below the fender, into the work area of the rear tire. The only means provided for securing the device to the fender is bungee cord. The use of bungee cord allows the tray to uncontrollably rotate and slide along the fender, resulting in an extremely unstable work platform. It is believed that this device may tip when tools or parts are stored therein. The Moto-Tek® service tray is also limited to storage for basic parts and tools; there are no means for stabilizing cans or organizing loose tools, such as sockets and wrenches.

Another device, the Pit Clip™, available at http://pitdepot.com/pitclip.html, provides a single level tray for storing tools and parts that clips onto the rear fender of a dirt bike. Similar to the Moto-Tek® service tray, the Pit Clip™ is believed to be quite unstable, as it is securable to only the rearmost edge of the dirt bike fender, and provides no means for holding cans in an upright position or organizing loose tools. The clip used to secure the tray to the fender may not be adequate to prevent the tray from detaching and falling from the fender, especially if the tray is off balance when loaded with tools and parts.

The present invention provides a novel fender-mountable utility tray that overcomes the inherent disadvantages found in conventional utility tray designs.

BRIEF DESCRIPTION OF THE DRAWINGS

FIG. 4 is a side view of the utility tray formed in accordance with the present invention, also showing a partial cross-sectional view of the fender pocket with the rear fender of the dirt bike therein.

FIG. 5 is a transverse cross-sectional view of the utility tray formed in accordance with the present invention, showing the rear fender within the fender pocket.

FIG. 6 is a perspective view of the utility tray formed in accordance with the present invention, showing the utility tray hanging from a hook on a wall.

FIG. 7 is a side view of a dirt bike with the utility tray formed in accordance with the present invention affixed to the rear fender thereof.

DETAILED DESCRIPTION OF THE PREFERRED EMBODIMENTS

Figure 1:
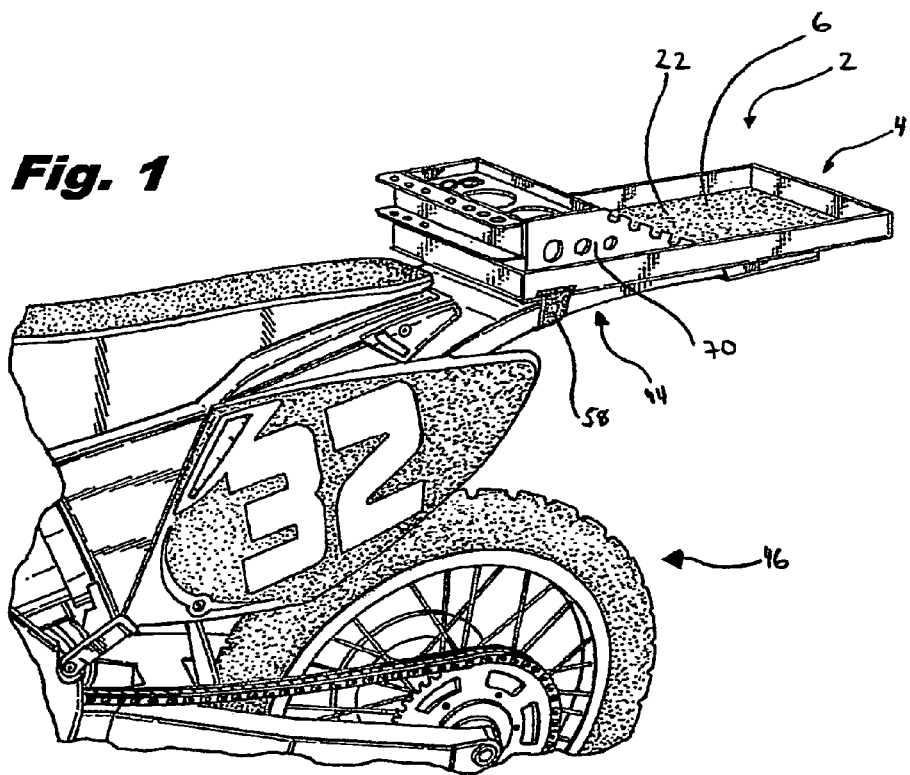
FIG. 1 is a perspective view of the rear end of a dirt bike with the utility tray formed in accordance with the present invention affixed to the rear fender.
Figure 2:
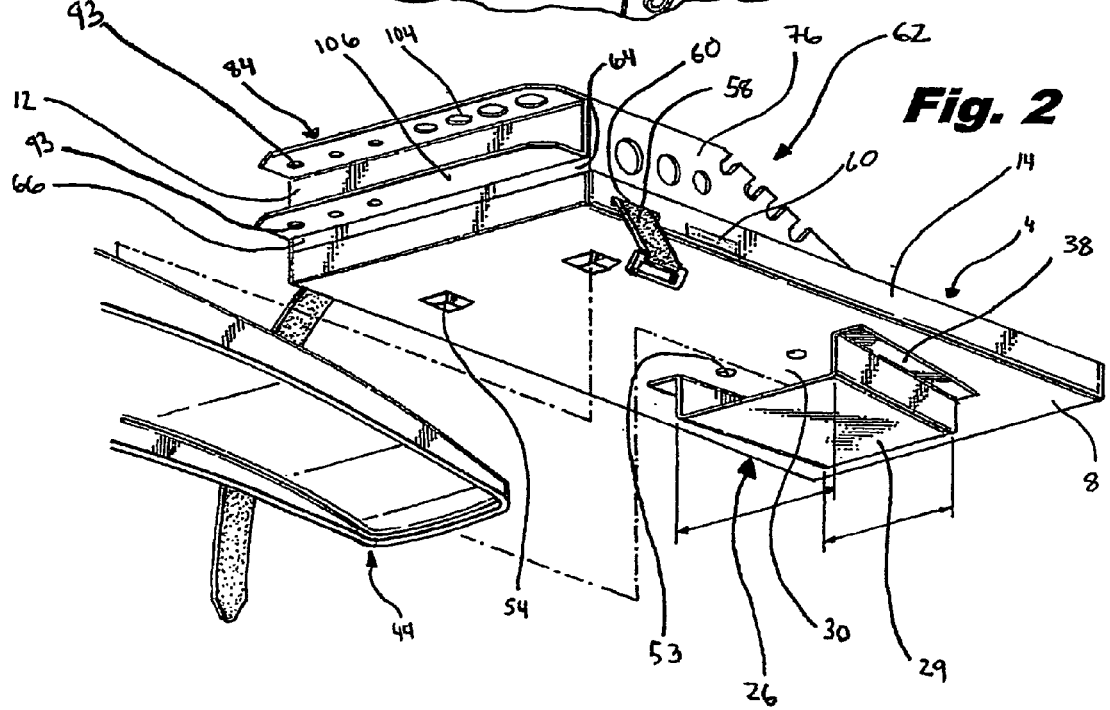
FIG. 2 is a perspective view of the bottom surface of the utility tray formed in accordance with the present invention, showing the fender pocket and standoffs.
Figure 3:
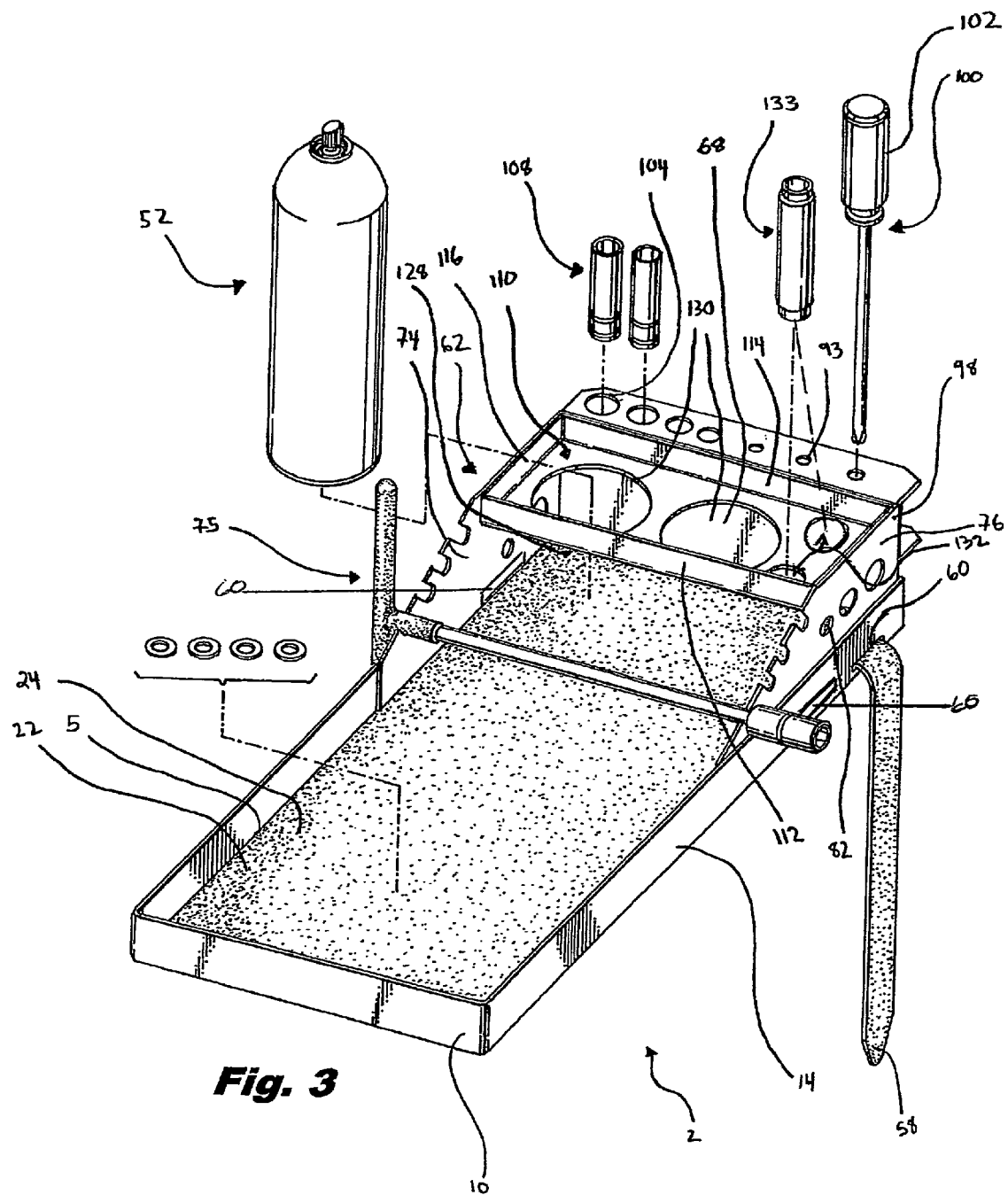
FIG. 3 is a top perspective view of the utility tray formed in accordance with the present invention.
Figure 8:
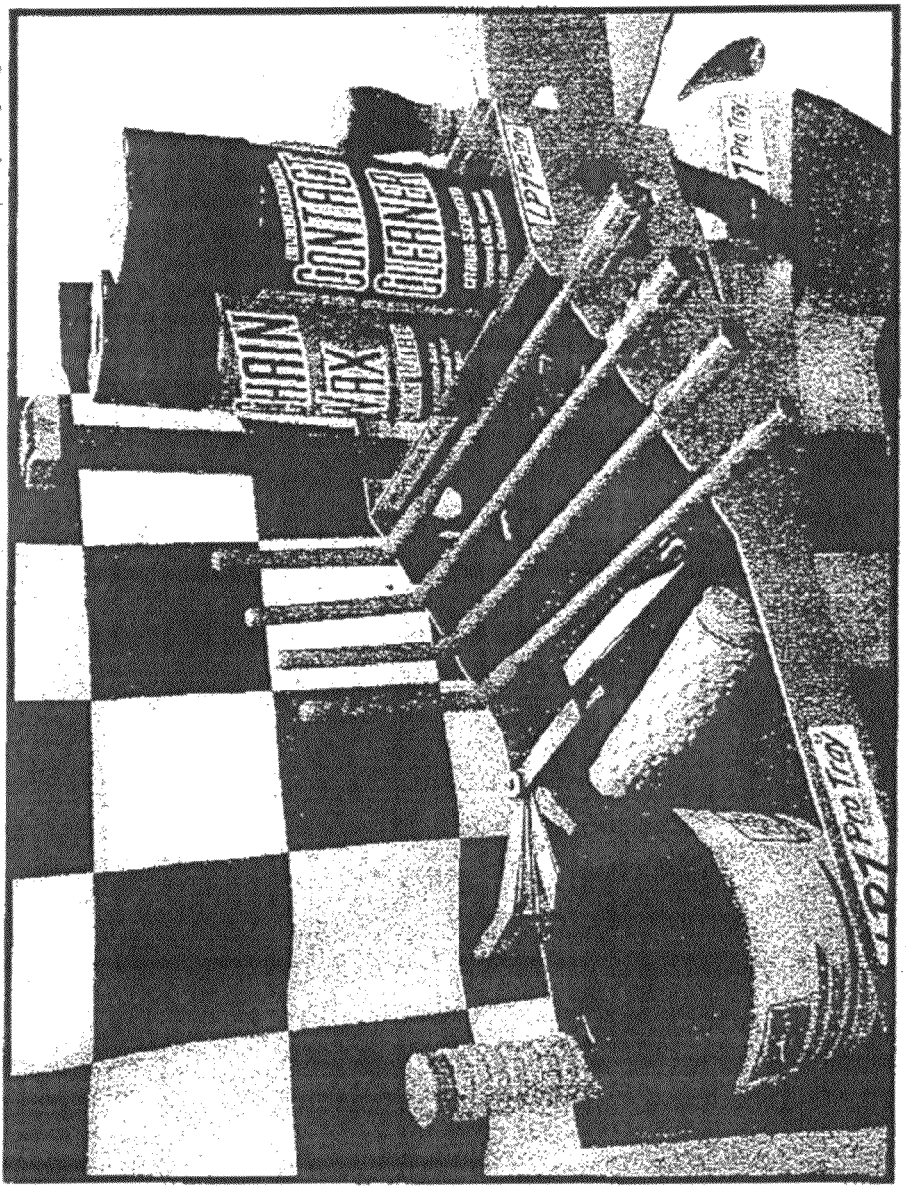
FIG. 8 is a photo of the top and side view of the utility tray mounted to the rear fender of the motorcross bike, with Tee Handle Wrenches, aerosol cans, axle and parts.
Figure 9:
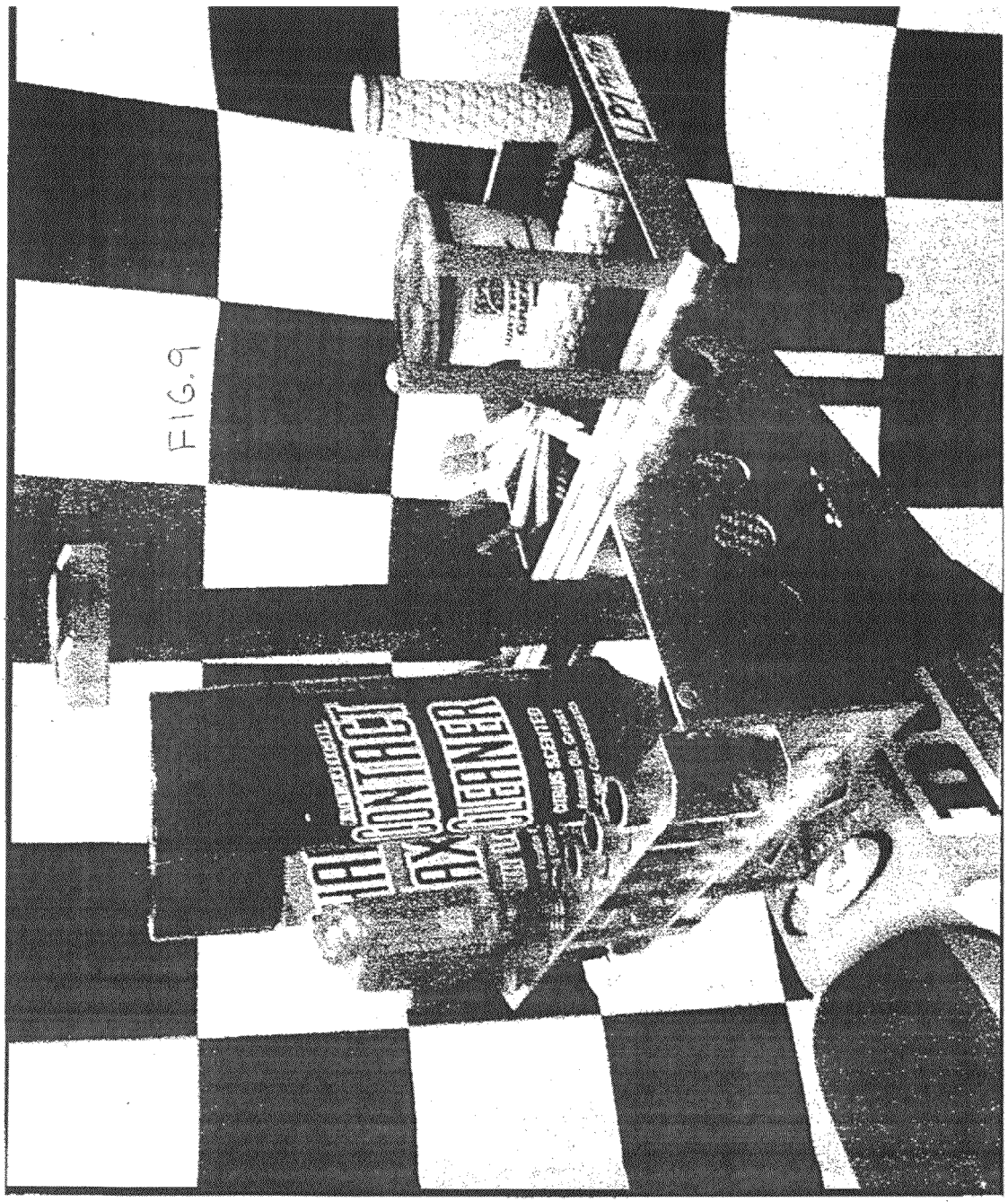
FIG. 9 is a photo view of the utility trays tool rail with sockets and screwdrivers.
Figure 10:
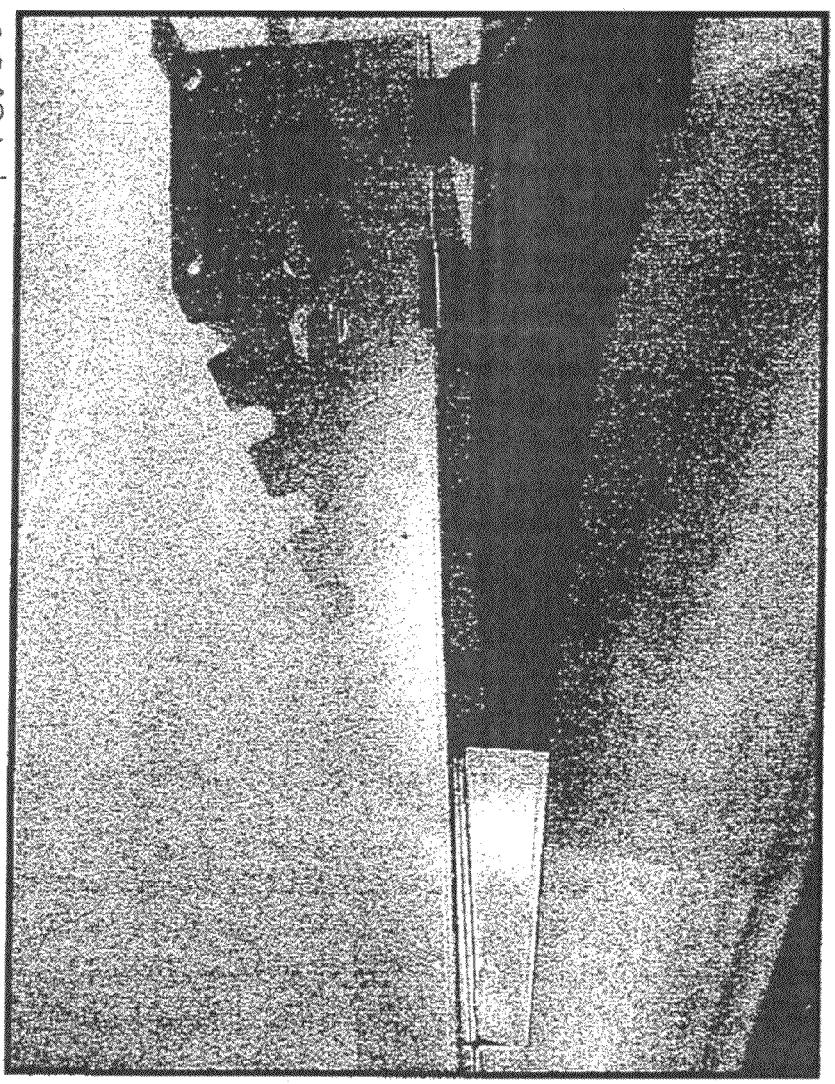
FIG. 10 is a photo of the side view of the utility tray mounted to the rear fender with its four standoffs, safety strap and the fender pocket. Note how the bottoms of the utility tray dose not contact the top of the fender. Also the tip of the rear fender is into the fender pocket.
Figure 11:
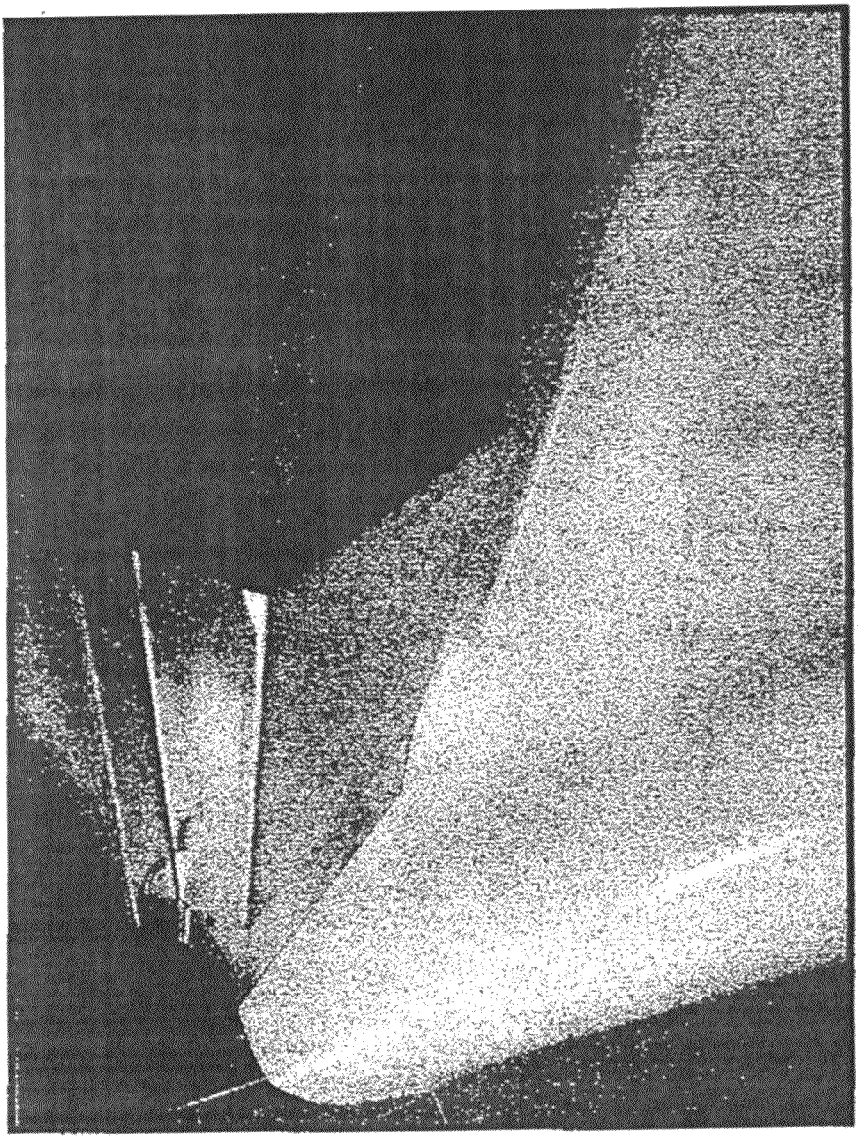
FIG. 11 is a photo of the bottom and side view of the fender in the trapezoid fender pocket.
Figure 12:
FIG. 12 is a top view of the utility tray mounted to the wall bracket in its vertical storage position, with three aerosol cans installed.

In accordance with a preferred embodiment of the present invention, a fender mountable utility tray 2 includes a generally rectangular main frame 4 having a top surface 6 and oppositely disposed bottom surface 8. The main frame 4 further includes a front wall 10, oppositely disposed back wall 12 and lateral side walls 14 situated therebetween. As shown in FIGS. 1-3 of the drawings, each of the front wall 10, back wall 12 and side walls 14 extends perpendicularly upwardly from the top surface 6 of the main frame 4 along its outer edge 5 to define a confined space 22 for holding tools and parts. As shown in FIG. 3 of the drawings, the utility tray 2 may further include a covering 24, such as non-slip matt or protective rubber cover, positioned on the top surface 6 within the confined space 22.

Now referring to FIGS. 2, 4 and 5 of the drawings, the utility tray further includes a fender pocket 26 affixed to the bottom surface 8 of the main frame 4. More specifically, in a preferred embodiment of the present invention, the fender pocket 26 is defined by a base member 28, the base member 28 having a bottom wall 29, an open front end 30, an oppositely disposed closed back wall 32 and lateral side walls 34 situated therebetween, the open front end 30 being larger in height and width than the closed back wall 32, and the side walls 34 mutually converging in a direction from the open front end 30 to the back wall 32, to define the pocket with an overall trapezoidal shape when viewed from the bottom and the side of the tray.

More specifically, the side walls 34 extend perpendicularly from the bottom wall 29 of the base member 28 towards the bottom surface 8 of the main frame 4. The side walls 34 and back wall 32 further include mounting flanges 38, the mounting flanges 38 extending outwardly from the side walls 34 of the base member 28 and back wall 32. The mounting flanges 38 include a top surface 40, the top surface 40 being parallel and affixed to the bottom surface 8 of the main frame 4 by welding, fasteners or the like.

The fender pocket 26 defined by the base member 28 is preferably positioned in proximity to the front wall 10 of the main frame 4, the fender pocket 26 further being centered between the side walls 14 of the main frame 4. The bottom surface 8 of the main frame 4, and the side walls 34 of the base member 28, thus define the open front end 30 for receiving the rear fender 44 of a dirt bike 46 or other similar motorcross vehicle having a rear fender 44. The rear fender 44 is received through the open front end 30 into the interior space 48 of the fender pocket 26 defined by the base member 28. As shown in FIG. 6 of the drawings, when the utility tray 2 is not in use, it may be stored on a wall or rack by hanging it on a hook 50, which is received by the fender pocket 26. When the utility tray 2 is stored in a hanging position, cans 52 and tools may be stored in an upright position, as will be explained further.

The fender pocket 26 further includes a first pair of semi-rigid standoffs 53 formed of rubber or other similar material that extend downwardly from the bottom surface 8 of the main frame 4. The standoffs 53 are particularly situated within the interior space 48 of the fender pocket 26 to contact the top surface 55 of the fender 44 received by the fender pocket 26. Referring to FIGS. 4 and 5 of the drawings, it can be seen that the top surface 55 of the rear fender 44 engages a second pair of relatively larger standoffs 54 extending from the bottom surface 8 of the main frame 4 as well as the standoffs 53 situated within the fender pocket 26. Preferably, the bottom edges 56 of the rear fender 44 touch the side walls 34 and bottom wall 29 of the base member 28 defining the fender pocket 26, so that the fender 44 is securely wedged within the confines of the pocket 26 and prevented from wobbling laterally.

The standoffs 53 of the first pair are spaced apart from each other, and the standoffs 54 of the second pair are similarly spaced apart from each other, predetermined distances which are selected by taking into account the height of the standoffs and the transverse curvature of the rear fender 44 of the dirt bike so that the tray 2 rests on the fender 44 at four points (i.e., where the standoffs 53, 54 are located) without the bottom surface 8 touching the fender 44 of the dirt bike. Furthermore, the first pair of standoffs 53 are separated from the second pair of standoffs 54 a second predetermined distance which is selected by taking into account the height of the standoffs and the longitudinal curvature of the rear fender 44 so that the bottom surface 8 of the main frame 4 does not rest on the top surface of the fender 44, to also allow the tray 2 to rest on the fender 44 of the dirt bike only by the standoffs 53, 54 so as to avoid any forward/rearward instability when the tray 2 is mounted on the fender 44. The standoffs 53, 54 thus provide further stability to the tray as well as minimize any cosmetic deformation of the rear fender 44.

The utility tray 2 further preferably includes an auxiliary stabilizer strap 58 in proximity to the back wall 12 of the main frame 4. More specifically, each lateral side wall 14 of the main frame 4 includes two slots 60 in proximity to the back wall 12 of the main frame 4 to receive the auxiliary stabilizer strap 58. Once the rear fender 44 has been received by the fender pocket 26, the stabilizer strap 58 is wrapped around the rear fender 44 and secured thereto. The strap 58 may be secured by conventional means, such as a buckle, snap, Velcro™ or other similar device.

The combination of the fender pocket 26, standoffs 53, 54 and auxiliary stabilizer strap 58 minimize transverse and longitudinal movement of the utility tray 2 with respect to the rear fender 44 of the dirt bike 46. More specifically, the standoffs 53, 54 and fender pocket 26 minimize side-to-side movement of the utility tray 2. The side walls 34 extending from the back wall 32 of the base member 28 minimize axial movement of the utility tray 2. For example, once the rear fender 44 has been inserted through the open front end 30 of the wedge-shaped fender pocket 26, the fender 44 is stopped by the back wall 32, preventing further movement of the tray 2 longitudinally on the dirt bike towards the front end thereof. Similarly, the auxiliary stabilizer strap 58 securing the back wall 12 of the tray 2 to the rear fender 44 minimizes movement of the tray 2 in a backwards direction on the dirt bike 46.

Now referring to FIGS. 1-3 of the drawings, an angled tool holder 62 extends perpendicularly from the top surface 6 of the main frame 4 in proximity to the back wall 12. More specifically, the angled tool holder 62 includes a rear wall 64, the rear wall 64 being generally rectangular in shape. The rear wall 64 includes a back surface 66 and a front surface 68. The back surface 66 of the rear wall 64 is preferably parallel to and in contact with the inner surface 18 of the back wall 12 of the main frame 4.

The angled tool holder 62 further includes first and second lateral side walls 70, 72, each of the first and second side walls 70, 72 having inner and outer surfaces 74, 76. The first and second side walls 70, 72 extend perpendicularly from the rear wall 64 towards the front wall 10 of the main frame 4, the outer surfaces 76 of the first and second side walls 70, 72 being parallel to and in contact with the inner surfaces 18 of the side walls 14 of the main frame 4.

Each of the first and second side walls 70, 72 includes an angled portion 78 having a plurality of spaced apart U-shaped slots 80 situated along a top edge 83 thereof, the U-shaped slots 80 of the first side wall 70 being aligned with the U-shaped slots 80 of the second sidewall 72. As shown in FIG. 3 of the drawings, tools such as a tee handle wrench 75 may be held by the U-shaped slots 80. Preferably, each angled portion 78 of the side walls 70, 72 includes four (4) U-shaped slots 80 to hold four tools such as tee handle wrenches 75 extending across the width of the tray 2. As shown in FIG. 4 of the drawings, each of the first and second side walls 70, 72 of the angled tool holder 62 further includes a plurality of spaced apart tool holding holes 82 situated transversely thereon, the tool holding holes 82 of the first side wall 70 being aligned with the tool holding holes 82 of the second side wall 72. The tool holding holes 82 are preferably varied in diameter so as to accept several different types of tools. Furthermore, the tool holding holes 82 allow the utility tray 2 to have an overall lighter weight due to decreased amount of material.

Now referring to FIGS. 2 and 3 of the drawings, the utility tray 2 further includes a tool rail 84. The tool rail 84 is preferably formed as an elongated U-shaped member 86 extending widthwise on the tray 2. The U-shaped member 86 has a base member 88 and a first and second tool rack 90, 92 extending perpendicularly outwardly therefrom, the first and second tool racks 90, 92 being parallel to each other. The base member 88 further includes a front surface 94 and an opposite back surface 96, the back surface 96 being affixed to a top portion 98 of the back surface 66 of the rear wall 64 of the angled tool holder 62.

Referring to FIG. 2 of the drawings, the first and second tool racks 90, 92 include a plurality of spaced apart holes 93, the holes 93 in the first tool rack 90 being aligned with the holes 93 of the second tool rack 92, so that the first and second tool racks 90, 92 may receive tools therebetween. For example, as shown in FIG. 3 of the drawings, a screwdriver 100 may be received by the holes 93, the handle 102 of the screwdriver 100 being supported by the first tool rack 90. The first tool rack 90 may further include a plurality of socket holes 104. The socket holes 104 of the first tool rack 90 are preferably aligned with a portion 106 of the second tool rack 92 that does not contain any holes. The socket holes 104 in the first tool rack 90 may receive parts or tools such as sockets 108. As shown in FIG. 3 of the drawings, the sockets 108 received by the socket holes 104 of the first tool rack 90 are held in place within the socket hole 104 and rest on the second tool rack 92.

The utility tray 2 further includes an upper tray portion 110, the upper tray portion 110 being generally rectangular in shape and having a front end wall 112, back end wall 114 and side walls 116 situated therebetween. The upper tray portion 110 further includes a lower surface 118 surrounded by walls 112, 114 and 116. The upper tray portion 110 is positioned within the angled tool holder 62 in a space 128 defined by the rear wall 64 and the first and second side walls 70, 72 of the angled tool holder 62, in proximity to the back wall 12 of the main frame 4. The upper tray portion 110 further includes a plurality of relatively large diameter holes 130 formed through the thickness of the lower surface 118, which surface overlies the top surface 6 of the tray 2. Preferably, the upper tray portion 110 includes two large holes 130 that are dimensioned to receive cans such as aerosolized lubricants. The upper tray portion 110 also includes two small hole 132, or a plurality of small holes 132, formed through the thickness of the lower surface 118 for receiving a tool or part such as a front or rear axle 133. The items received by the large and small holes 130, 132 of the upper tray portion 110 are held in place within their respective hole and rest on the top surface 6 of the main frame 4.

The utility tray 2 formed in accordance with the present invention is mounted on the rear fender 44, or even the front fender, of the dirt bike. The rear fender 44 is received by the fender pocket 26 attached to the bottom surface 8 of the main frame 4. The fender pocket 26 and rear fender 44 secured therein minimize any side-to-side or front-to-back movement of the utility tray 2 with respect to the rear fender 44 and dirt bike 46. The auxiliary stabilizer strap 58 is secured around the rear fender 44 and provides additional support to the utility tray 2 with respect to the rear fender 44 and dirt bike 46. The combination of the fender pocket 26 and auxiliary stabilizer strap 58 provides an extremely stable utility tray 2 that resists transverse and longitudinal movement when mounted on the dirt bike. The tray 22 defined by the top surface 6 of the main frame 4 and walls extending therefrom provides a clean, large working surface for parts and tools, such as oil cans and drain plugs, as well as air filters, handle bar grips, clutch plates and the like. In a preferred embodiment, the angled tool holder 62 provides storage for four (4) or more tee handle wrenches 75 within the U-shaped slots 80 formed in the angled portion 78 of the side walls 70, 72 and tool holding holes 82 formed therein. The tool rail 84 positioned on the top portion 98 of the rear wall 64 of the angled tool holder 62 provides storage means for screwdrivers 100, sockets 104 and the like. The upper tray portion 110 positioned within the angled tool holder 62 provides storage for preferably two aerosolized cans 52 and for parts, such as an axle 133, which is extremely beneficial while changing a tire.

Referring to FIG. 6 of the drawings, the tray 2 may be stored in an upright position on a wall by inserting a wall mounted hook 50 into the open front end 30 of the fender pocket 26. Aerosol cans 52 may be held in an upright position between the top surface 6 of the tray 2 and the upper tray portion 110.

The present invention is constructed form aluminum that is laser cut and bent to perfection, it is to be understood that the invention is not limited to this material and that it can be constructed of a variety of materials without departing from the spirit or scope of the invention.

Although illustrative embodiments of the present invention have been described herein with reference to the accompanying drawings, it is to be understood that the invention is not limited to those precise embodiments, and that various other changes modifications and material may be effected therein by one skilled in the art without departing from the scope or spirit of the invention.

The embodiments of the invention in which an exclusive property or privilege is claimed are defined as follows:

1. A fender mountable utility tray that is securely mounted to the rear fender of a motorcycle, comprising:
   a generally rectangular shaped main frame, said main frame being defined by a bottom wall, a front wall, a rear wall and lateral side walls;
   a trapezoidal fender pocket, said fender pocket is defined by a bottom surface, a rear wall, and two sidewalls that are tapered in shape, with the opening of the trapezoid fender pocket facing towards the rear wall of the main frame, said fender pocket mounted to the bottom of the main frame located towards the front of the main frame, the bottom of the main frame further including four non slip standoffs;
   an auxiliary stabilizer strap, wherein the side walls of the main frame incorporate elongated holes for the auxiliary stabilizer strap, wherein the main frame side walls further comprise angled parts which have U-shaped slots for specific tools;
   an upper tray comprising a lower surface surrounded by front, rear, and side walls, said upper tray having two large and two small holes;
   a tool rail positioned on the top of the rear wall of the main frame, said tool rail consisting essentially of specific holes for bolts and tools;
   wherein said fender pocket engages a wall mount bracket for storing the utility tray.

2. The rear fender utility tool tray defined in claim 1, wherein the angled parts of the main frame side walls have a plurality of said U-shaped slots spaced apart along a top edge thereof, wherein said slots are specific for Tee handle wrenches that will lay across the main frame from slot to slot, and said elongated holes that accommodate the auxiliary stabilizer strap are located on both sidewalls, towards the rear of the main frame.

3. The rear fender utility tray defined in claim 1, wherein the side walls of the fender pocket are tapered inwardly towards the rear wall of the fender pocket, and the bottom surface of the fender pocket is tapered upwardly towards the rear wall of the fender pocket.

4. The rear fender utility tray defined in claim 1, wherein upon insertion of the fender into the fender pocket, the standoffs securely wedge the fender within the fender pocket.

5. The rear fender utility tray defined in claim 1, wherein said specific holes of said tool consist of seven specific holes for sockets, screwdrivers, bolts and tools.

6. The rear fender utility tray defined claim 1, wherein said wall mount bracket engages, the trapezoidal fender pocket so as to store the utility tray in vertical position, furthermore while in the vertical position the utility tray will accommodate three aerosol cans.

\* \* \* \* \*